United States Patent [19]

Martin

[11] Patent Number: 5,610,674

[45] Date of Patent: Mar. 11, 1997

[54] PRECISION FRAGRANCE DISPENSER APPARATUS

[76] Inventor: David A. Martin, 11422 Willow Gardens Dr., Windermere, Fla. 34786

[21] Appl. No.: 492,401

[22] Filed: Jun. 19, 1995

[51] Int. Cl.⁶ .................................................... G03B 21/32
[52] U.S. Cl. ............................................................ 352/85
[58] Field of Search ................................. 352/85; 472/59, 472/65; 297/217.4; 348/121, 460, 46, 578; 345/8

[56] References Cited

U.S. PATENT DOCUMENTS

| | | | |
|---|---|---|---|
| 2,813,452 | 6/1954 | Laube | 352/85 |
| 2,905,049 | 6/1956 | Laube | 352/85 |
| 3,628,829 | 12/1971 | Hellig | 297/217 |
| 3,795,438 | 3/1974 | Westenholz et al. | 352/85 |
| 4,310,307 | 1/1982 | Bellisario | 433/33 |
| 4,603,030 | 7/1986 | McCarthy | 422/4 |
| 4,952,024 | 8/1990 | Gale | 350/143 |

*Primary Examiner*—Safet Metjahic
*Assistant Examiner*—Matthew Miller
*Attorney, Agent, or Firm*—William M. Hobby, III

[57] ABSTRACT

A fragrance dispenser for use with synchronized visual images may have a breath sensor located adjacent a person's nose and actuated by inhaling and exhaling through the nose to produce a fragrance dispensing signal and a plurality of fragrance dispensers each having a fragrance release portion positioned adjacent a person's nose for dispensing a fragrance adjacent the nose responsive to a fragrance dispensing signal from the breath sensor. The system has a source or pressurized gas connected to each fragrance dispenser and a gas pressure control mechanism connected between the source of pressurized gas in each of the plurality of fragrance dispensers and connected for receiving the breath sensor fragrance dispensing signals to selectively control the release of a pressurized gas, such are air, to individual fragrance dispensers for selectively dispersing the different fragrances responsive to signals from the breath sensor. The breath sensor may be a flexible thin flat surface having a conductive surface mounted adjacent separated contacts so that the breath moving the flexible surface brings a conductive surface against the contact to produce a signal. Each fragrance dispenser has a housing having an absorbent material therein supporting a fragrance absorbed in the material. Each housing can have long or short capillary tubing or a flexible membrane covering one end thereof and having a slit opening therethrough to allow the egress of a fragrance upon predetermined air pressure entering the housing. The housing can also have a flexible membrane covering the other end for allowing the ingress of air under pressure but blocking the egress of the fragrance therethrough. The source of air can be an oil-free air compressor or a compressed gas in a container.

20 Claims, 6 Drawing Sheets

PRECISION FRAGRANCE DISPENSER APPARATUS

BACKGROUND OF THE INVENTION

This invention relates to a precision fragrance dispenser apparatus and especially to a fragrance dispenser suitable for use in theaters, computer games, and virtual reality shows or anywhere it is desirable to coordinate smell with visual and audio image displays.

Precision fragrance dispensing is made directly to an individual and is coordinated with the viewing of a motion picture or television or to the viewing of an image in virtual reality or in computer games so that the viewer can realistically experience the full effect or illusion of being a part of or physically responding to the environment depicted by the viewed image and the accompanying audio. Existing theatre systems and television and computer games and virtual reality generally are provided with a visual image along with the audio used in connection with the visual image. Past attempts, however, at incorporating the addition of smell to the overall viewing environment have not generally been successful and have not been widely accepted. One of the reasons for the lack of acceptance is the difficulty of providing smell to an individual user with any precision without providing the dispensed spell to a large area and to the problem of dissipating one smell and feeding a second smell as the scenes being viewed change. The smell sensation loses its effect and does not tend to provide the more accurate smells that attend any particular scene being viewed.

One prior art patent which attempts to provide a combination of a viewing chair and sense stimulating means for use in motion picture television theaters is provided in U.S. Pat. No. 3,628,829 to Hellig and includes a seat with arm rests having a back which terminates into a hood over the chair. The chair includes means for rocking the chair in various directions as well as means for vibrating the chair and an odor producing system associated with the chair which includes odor conducting conduits and means for moving air through the odor producing conduits towards the face of the spectator seated in the chair. The chair includes air passageways and exit ports for directing air towards various portions of the spectator's body and a system for feeding the air to the air passageways and exhausting the odors around a chair for removing the odors. The Hellig system also includes a loudspeaker associated with the hood of a chair. This odor producing system attempts to direct the odors and the flow of air to the area around the user's head and nose and then exhausts it from the area around the user's head and maintains the odors by partially enclosing the head. This, however, has had limited success because of the inability to precisely govern the dispensing of the various smells at precise moments and due to the delay in removing the generated odor in the area of the user's head.

The present invention is directed towards a precision fragrance dispenser which accurately dispenses the fragrances to an individual controlled by the individual's breathing and localized to the intake of air by the individual.

SUMMARY OF THE INVENTION

A fragrance dispenser for use with synchronized visual images located adjacent a person's nose and actuated by inhaling and exhaling through the nose. Each of a plurality of fragrance dispensers has a fragrance release portion positioned adjacent a person's nose for dispensing a fragrance adjacent the nose responsive to the person's breathing and may be responsive to a fragrance dispensing signal from a breath sensor. The system has a source of pressurized gas connected to each fragrance dispenser and a gas pressure control mechanism connected between the source of pressurized gas in each of the plurality of fragrance dispensers and connected for receiving fragrance dispensing signals to selectively control the release of a pressurized gas, such as air, to individual fragrance dispensers for selectively dispersing the different fragrances responsive to the signals. The signals may be generated by a breath sensor or by cues from the visual images. The breath sensor may be a flexible thin flat surface having a conductive surface on one side mounted adjacent separated electrical contacts so that the breath moving the flexible surface brings the conductive surface against the contacts to produce a signal. Each fragrance dispenser has a housing having an absorbent material therein supporting a fragrance absorbed in the material. Each housing has a thin capillary tube exit or may have a flexible membrane covering one end thereof and having a slit opening therethrough to allow the egress of a fragrance upon predetermined air pressure entering the housing. The housing can also have a flexible membrane covering the other end for allowing the ingress of air under pressure but blocking the egress of the fragrance therethrough. The source of air can be an oil-free air compressor or a compressed gas in a container or the like.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figures 1, 5, 5A, 6, 6A:
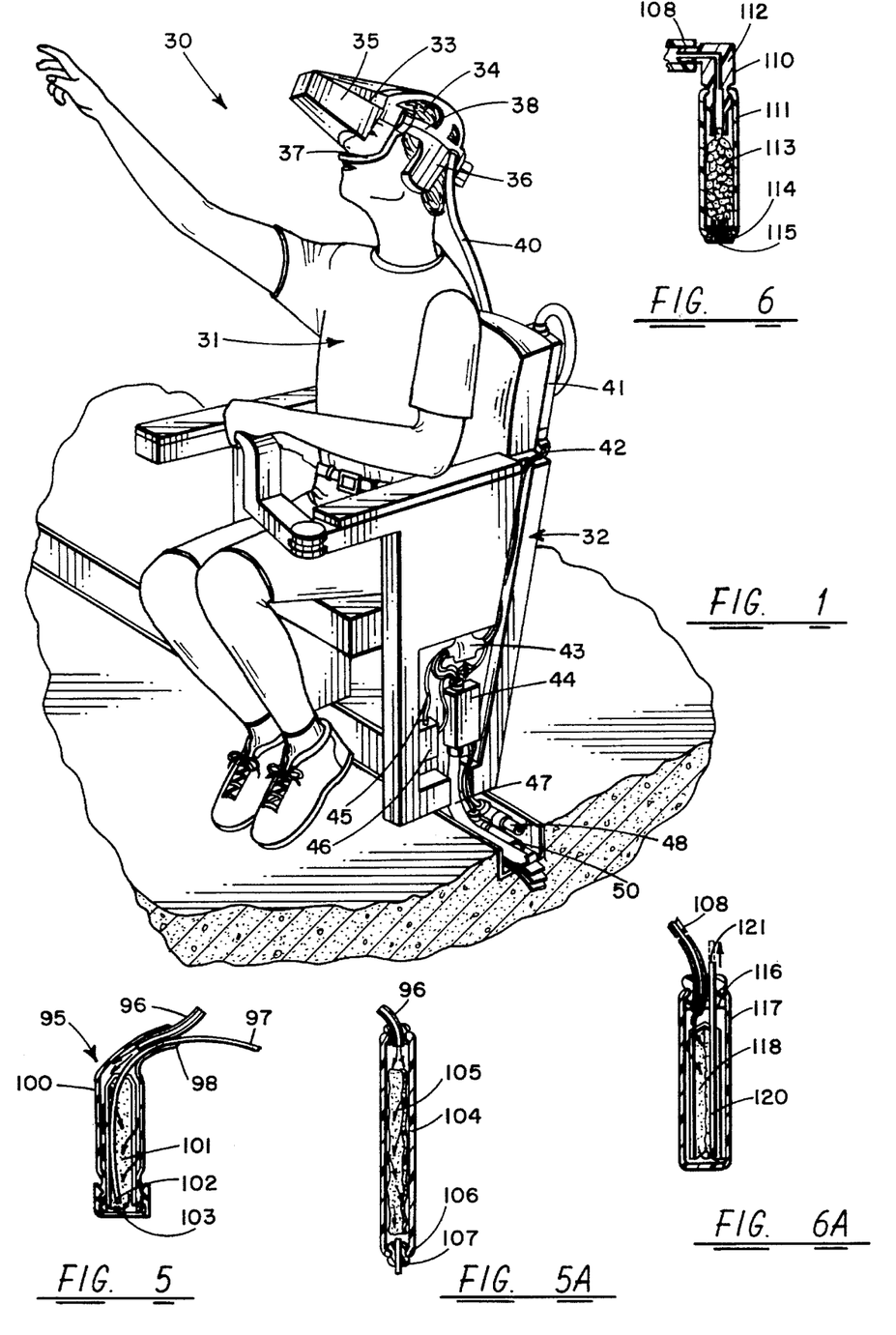
FIG. 1 is a perspective view of a precision fragrance dispenser mounted to a virtual reality system.
FIG. 5 is a sectional view of a fragrance dispenser.
FIG. 5A is a sectional view of a second fragrance dispenser.
FIG. 6 is a sectional view of a second embodiment of a fragrance dispenser.
FIG. 6A is a sectional view of another embodiment of a fragrance dispenser.

Referring to the drawing, FIG. 1 is an illustration of a preferred embodiment of a precision fragrance dispenser 30 shown in use with a virtual reality show and has a person 31 seated in a chair 32 and having a virtual reality headset 33 mounted on the head 34. The virtual reality headpiece 33 includes the virtual reality viewing goggles 35 having the audio headphones 36 over the user's head and ears and include a fragrance dispenser dispensing end 37 where individual fragrances are emitted and where the breath sensor membrane with contacts are located. The fragrances can be drawn from the dispensers by a person inhaling rather than using a breath sensor. The fragrance dispenser portion 37 is connected through a head support member 38 to a bundle of individual fragrance laden gas lines 40. The fragrance line 40 is attached to a fragrance dispenser array 41 mounted on the back of the chair 32. The individual gas supply lines 42 are connected from the fragrance dispenser array 41 down along the chair 32 to a quick disconnect 43 and are connected into the electronic manifold card 44. The breath sensor is connected through an electrical wire 45 to the breath electronics module 46 to operate the breath sensor to provide breath feedback signals to the computer to operate the electronic manifold card in sync with breathing (if used). A plurality of strip wires 47 are attached through a standard 25 pin connector for the electronic manifold card 44 to connect the show synchronizing computer control to the precision fragrance dispenser. Compressed gas is fed through the gas service line 48 for the electronic manifold card 44 and a vacuum service line 50 may be used for purging the line at the fragrance dispenser end 37. The dispenser 30, as shown in FIG. 1, can also be applied to theaters as well as to mall rides, motion base rides, theme park rides, and the like. Service supply lines pass adjacent each seat 32 and are tapped into by the individual seat installation. The service lines can be routed beneath the seats, behind the seats, or even above the seats as desired.

Figure 2:
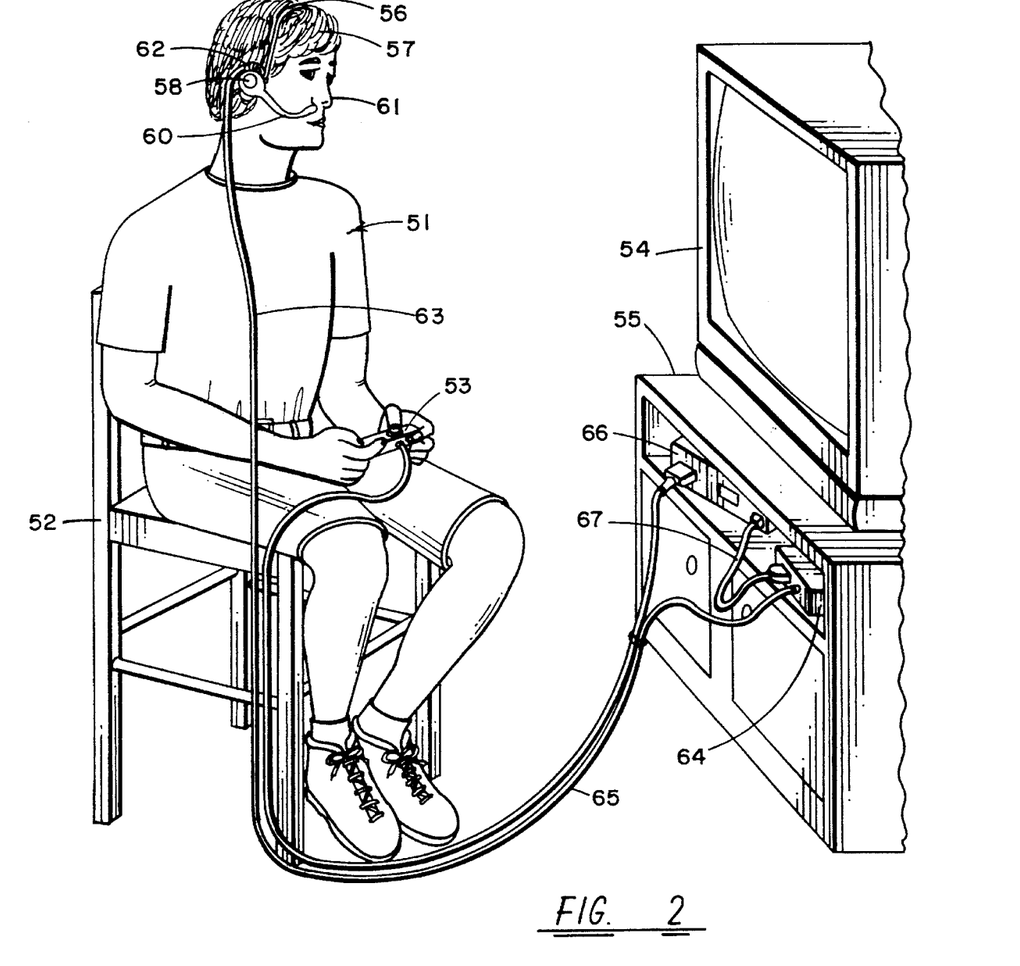
FIG. 2 is a perspective view of a precision fragrance dispenser interfaced with a video game.

FIG. 2 provides a fragrance dispenser set-up for use in connection with a computer game or the like in which a computer user 51 is seated within a chair 52 and operates a computer game hand control 53 for controlling a television monitor 54 sitting on a table 55. The user 51 has a headset 56 on his head 57 which also has an audio speaker 58 placed over the ears and has a precision fragrance dispenser head 60 extending in front of the user's nose 61. A disconnect plug 62 connects and disconnects the individual gas supply lines to the headset and can be used when changing video games to companion game fragrances. The gas supply lines 63 are connected to the disconnect plug 62 on one end and to the fragrance dispenser control 64 at the other end and electrical conductors 65 are connected between the handsets 53 and the video games 66 for operating the conventional video game. A connection 67 from the video game 66 to the fragrance dispenser control card 64 provides cues to the electronics, electronic manifold card and gas supply. In the case of the video game of FIG. 2, each video game has its own set of appropriate fragrances purchased separately or with a game. The snap-on arm of fragrances is plugged into the gas supply connector and snapped onto the headset for dispensing the fragrances for any particular game.

Figure 3:
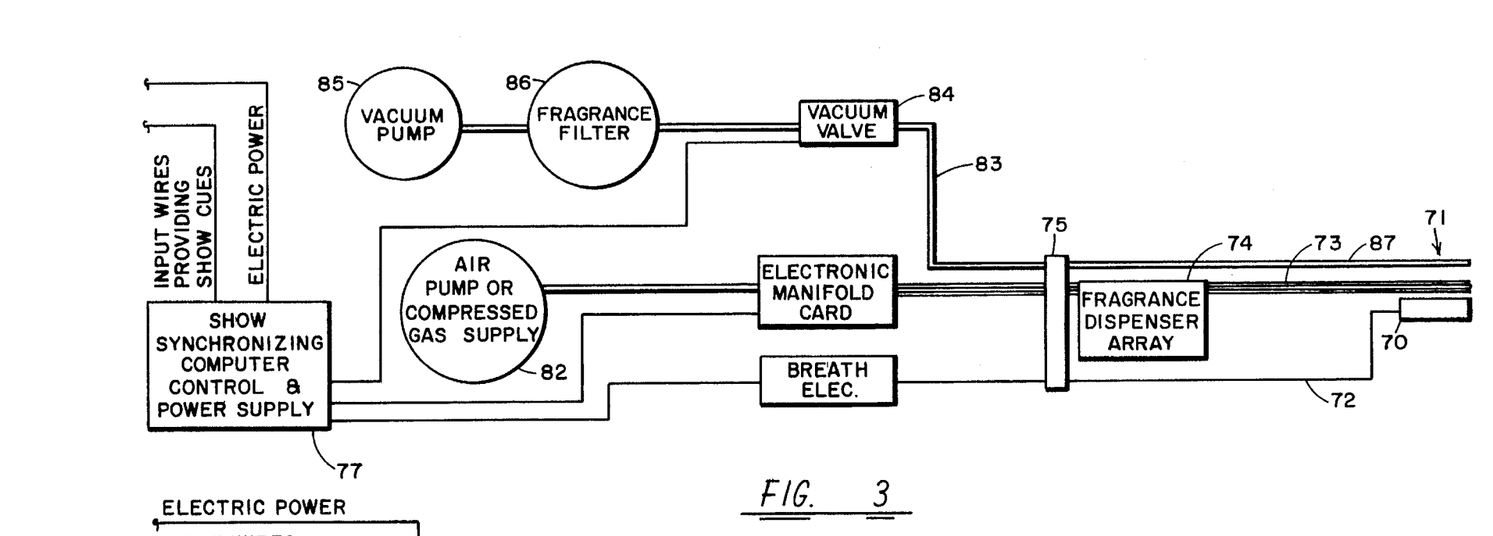
FIG. 3 is a schematic for a precision fragrance dispenser.
Figure 4:
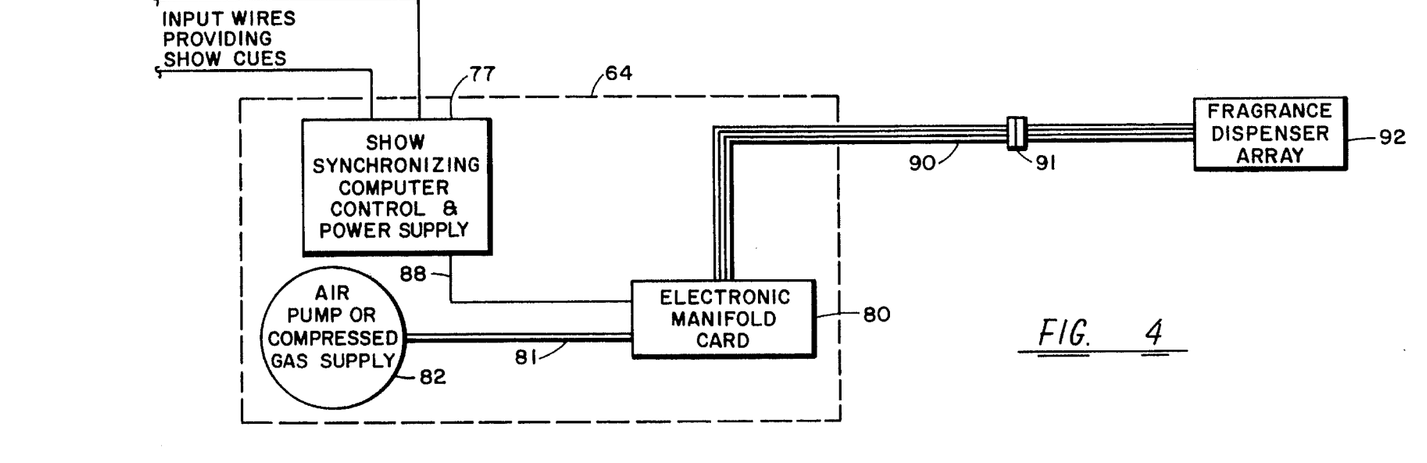
FIG. 4 is a schematic for a second precision fragrance dispenser.

Turning to FIGS. 3 and 4, schematics of a precision fragrance dispenser are illustrated with FIG. 3 having the dispensing occurring mid-way in the gas flow, as shown in FIG. 1, while in FIG. 4 an end dispenser dispenses directly in front of the nose, as shown in FIG. 2. In FIG. 3, a breath sensor 70 is connected on the dispensing end 71 and has electric conductors 72 connected to the sensor 70 while the individual fragrance lines 73 are connected to the dispensing end 71 for dispensing fragrances adjacent a user's nose. The fragrance dispenser array 74 is positioned in the line 73 and passes through a quick disconnect 75 which also disconnects the electrical conductor 72 containing the feedback signals from the breath sensor. The breath sensor electronics module 76 is located in the line and is connected to the show synchronizing computer control 77. Similar control wires 78 are connected between the computer 77 and the electronic manifold card 80 which also has the compressed gas line 81 connected from a compressed gas source 82. A vacuum line 83 is connected to a vacuum valve 84 and to a vacuum pump 85 and through a fragrance filter 86 on one end and through the quick disconnect 75 and through a vacuum line 87 to the dispensing end 71. The vacuum line withdraws fragrances after they have been dispensed by the individual fragrance gas lines 73 under pressure from the pressurized gas source 82 responsive to the breath sensor 70.

FIG. 4 shows another embodiment, as shown in FIG. 2, of a schematic in accordance with FIG. 3 having the computer control 77 along with a compressed gas source 82 and an electronic manifold card. Compressed gas is supplied from the source 82 through the gas line 81 to the electronic manifold card 80. Control wires 88 connect the computer control to the manifold card 80 which controls the dispensing of the individual gas lines 90 through a quick disconnect 91 to the fragrance dispenser array 92.

The schematic of FIG. 3 dispenses the fragrances midway in the gas flow line while the schematic of FIG. 4 dispenses the fragrance at one end of the gas flow line. The electronic manifold card 80 can utilize any of the commercially available boards, such as the Clippard card No. EMC-08-06-20 by Clippard Instrument Laboratory in Cincinnati, Ohio or any of the other Clippard cards, as well as other makes to control the gas flow to select the fragrance dispenser. These cards provide individually controlled gas output ports from a common manifold gas supply using either 6, 12, or 24 volt DC solenoids controllable directly from a computer through a standard 24 pin connector and can be manually controlled if desired. The gas supply 82 can be any source of clean and dry gas supplied in compressed bottles, liquid gas used in aerosols, or through an air compressor. Compressed bottled gas can be $CO_2$ nitrogen or any dry gas or merely compressed air. An air compressor can be utilized which provides an oil free air since the supply gas is breathed by the user. For video games, a low cost oil free tropical fish compressor is available. The gas is regulated to about 2 to 5 psi in a typical fragrance dispenser in accordance with the present invention.

Turning now to FIG. 5, a fragrance dispenser tip 95 is illustrated for use with frequent replenishment capability and has a tube 96 for the gas entering the dispenser and a tube 97 for fragrance laden gas exiting the dispenser. The tube 97 and body 100 are made of a material which does not permit fragrance migration through the tube wall or chemically react with the fragrance, such as glass and some plastics, as well as some non-reactive metals. Polyamide capillary tubing, made by Micropolyx in Chattanooga, Tenn., is particularly well suited for tube 97. An adhesive 98 seals one or more tubes to the body 100 of the dispenser tip 95. The body 100 holds the fragrance therein and allows a gas, such as air being fed thereinto, to become fragrance laden before dispensing. Arrows in the figure indicate the route taken by the incoming gas as it mingles with the fragrance fumes in the reservoir material 101. The reservoir material 101 holds the quantity of a fragrance, which can be polymer pellets or an absorbent or porous material, such as vermiculite, paper, cotton, carbon particles or any open celled polymer foam, or synthetic absorbent which holds substantial quantities of fragrance for a gradual release into the surrounding gas atmosphere. An exit port 102 allows for the removal of the fragrance laden gas and is positioned at the furthest end away from the inlet tube 96. A removal cap 103 is attached over the end of the body 100 and allows for replacement of the fragrances even through a non-removable cap could also be provided, such as an elastomer cover, which could have the fragrances refilled with a syringe.

FIG. 5A is a sectional view that shows a similar fragrance dispenser to that in FIG. 5 having the gas input tube 96 extending into a body 104 having the reservoir material 105 therein laden with a fragrance but having the tube for the fragrance laden gas exiting the dispenser through the tube 106 at the opposite end of the housing 104 and the adhesive 107 for sealing the container body 104.

Referring to FIGS. 6 and 6A, a replaceable disposal fragrance dispenser is illustrated in FIG. 6. The gas tube 108 feeds a gas into the tube cap 110 which in turn is attached to the tube body 111. The gas is fed through the molded tube cap 110 passageway 112 into the container 111 which has an absorbent or porous reservoir material 113 therein and an end cap 114 having a plurality of apertures 115 therethrough for dispersing fragrance laden gases. The sectional view in FIG. 6A has the gas line 108 feeding through the molded cap 116 into the body 117 of the dispenser. The absorbent or porous reservoir material 118 has a gas passing therethrough and into a TEFLON tube 120 having an extension 121 extending from the container 117 through the cap 116.

Figure 7:
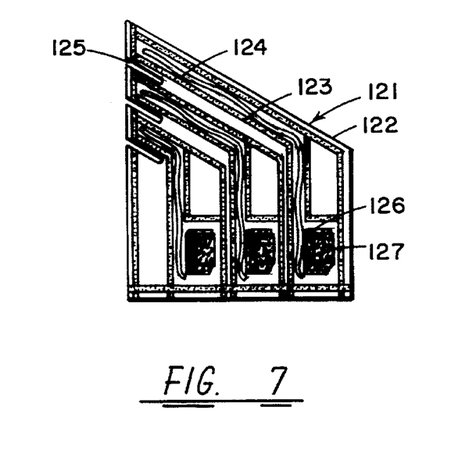
FIG. 7 is a sectional view of yet another embodiment of a fragrance dispenser.

Turning to FIGS. 7 and 7A, a non-replaceable disposable fragrance dispenser 121 is illustrated having a film bag 122 having a plurality of elongated heat seals 123 forming a plurality of channels 124 formed with non-compressible flexible passageway members. A plurality of slots 125 divide the individual passageway at the entrance. A pad of absorbent material 126 soaked with a fragrant material is mounted adjacent a resilient foam pad 127 alternately compressing and releasing the pad 127 which causes air to be drawn into the film bag where the air mingles with the fragrance and some fragrances are passed out of the film bag with the ejected air. This pumping affect disperses selected fragrances to the desired location only at the time that the selected pads 127 are alternatively compressed and released.

Figure 8:
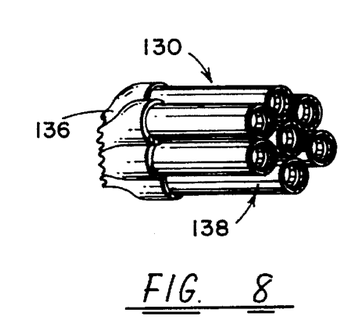
FIG. 8 is a perspective view of a plurality of fragrance dispensers bound together.
Figure 8A:
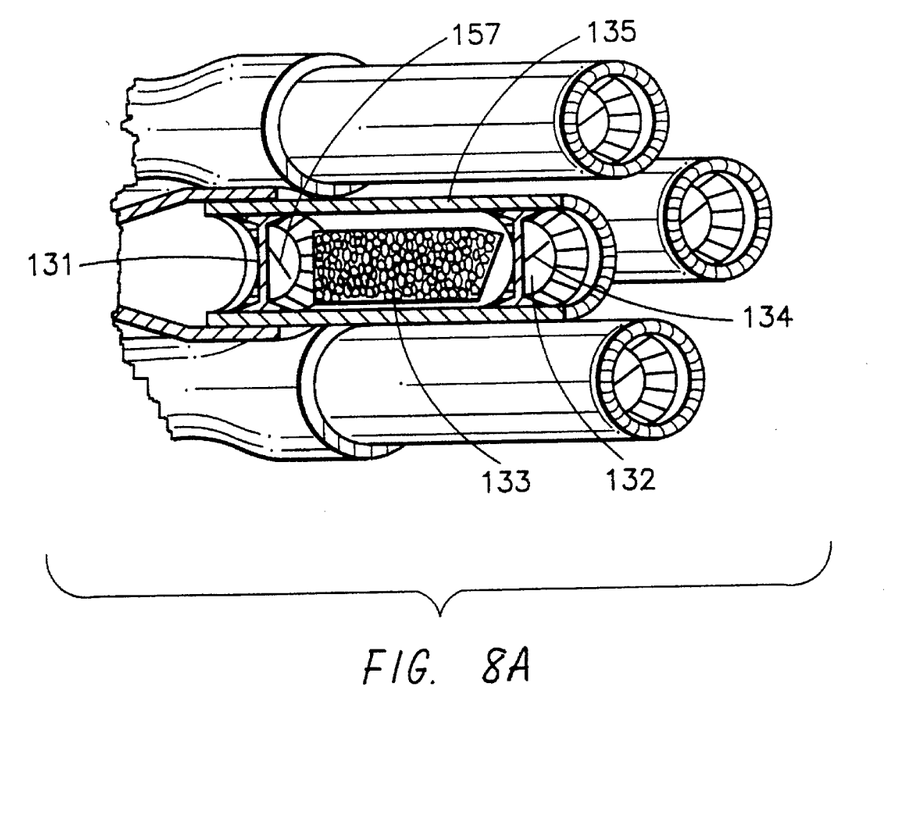
FIG. 8A is a cutaway perspective of an isolation membrane for use in the present fragrance dispenser.

Turning to FIG. 8, a fragrance dispenser 130 is illustrated having an isolation membrane 131 placed upstream of the fragrance location while an isolation membrane 132 is placed downstream of the fragrance. A porous material 133 holds the fragrance material therein. The membrane 132 has a perforation 134 therein. The membrane opening 134 remains closed and seals the fragrance within the body 135 in the absence of pressure and dispenses the fragrance only upon the application of pressure through the gas lines 136. The membrane 131 has a slot perforation 137 to allow the incoming air under pressure to pass therethrough and through the porous material 133 holding the fragrance therein. As seen in FIG. 8, a plurality of the dispenser 138 are attached together having a plurality of gas lines 136, one attached to each of the dispensers to provide dispensing of a plurality of different fragrances upon pressurized gas input from each line 136 being selectively applied to the desired dispenser, as shown in FIG. 8A.

Figure 9:
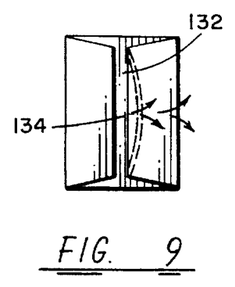
FIG. 9 is a sectional view of an isolation membrane.
Figure 9A:
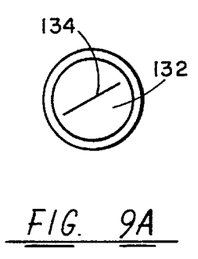
FIGS. 9A through 9E are different embodiments of an isolation membrane.
Figure 9B:
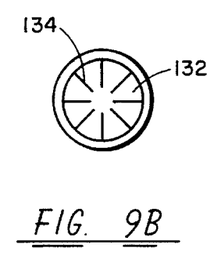
Figure 9C:
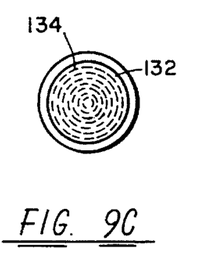
Figures 9D, 10:
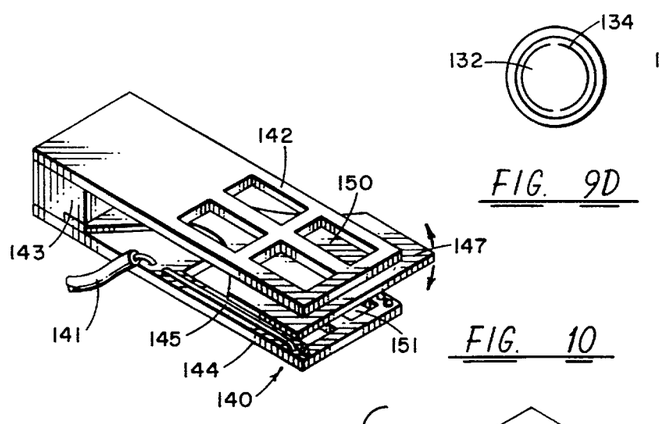
FIG. 10 is a perspective view of a breath sensor.
Figure 9E:
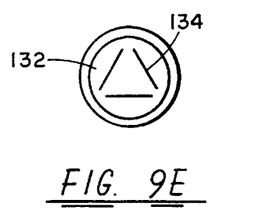

Turning to FIGS. 9 and 9A through 9E, several different isolation membranes 132 are illustrated each having a different shaped perforation 134 therein. FIG. 9A has one elongated slot 134 therein while FIG. 9B has radial slots and FIG. 9C has a plurality of small arcuate slots formed in a circular pattern. FIG. 9D has two semi-circular slots while FIG. 9E has triangular spaced slots. FIG. 9 shows a sectional view of one of the isolation membranes 132 having the slots 134 therein and being open on the application of air pressure to one side thereof.

Figure 11:
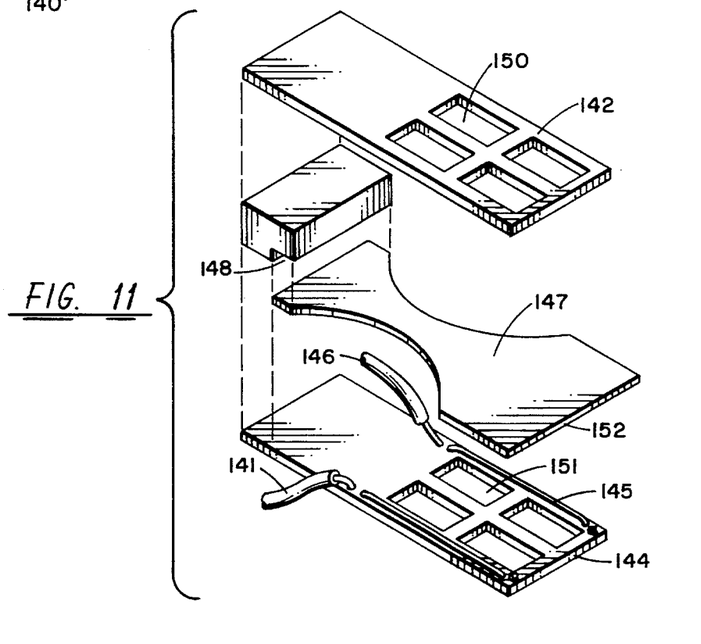
FIG. 11 is an exploded perspective view of the breath sensor of FIG. 10.

FIGS. 10 and 11 show a continuity breath sensor 140 having a connecting conductor 141 and having a top sensor plate 142 attached to one side of the spacer 143 and having a bottom platesensor 144 attached to the bottom of the spacer 143. A pair of leads 145 are attached to the bottom plate 144, one connecting to positive conductor 141 while the other one is connected to a negative conductor 146. A large thin membrane 147 is connected to the space 148 in the spacer 143 and extends between the upper plate 142 and the lower plate 140. The upper plate 142 has a plurality of openings 150 therein while the lower plate 144 has a plurality of openings 151 therein to allow the flow of air through the openings to be applied against the surface of the flexible membrane 147. The membrane 147 may be made of a thin film material, such as polyester, polyamide, mylar or the like, since the purpose is to bend back and forth responsive to very slight air movement. The bottom 152 of the membrane is coated with a conductive, non-oxidizing material in a very thin coating so that in responsive to movement, the membrane can contact the leads 145 or disengage from the leads 145 depending upon a slight air pressure against the surface of the flexible membrane 147 to thereby complete the circuit between the conductors 145. The sensor is, of course, placed in front of an individual's nose so that the slight air pressure from the nose can activate the fragrance dispenser system in accordance with the present invention. The continuity breath sensor of FIGS. 10 and 11 is placed in front of a person's nose so that upon inhaling, the membrane 147 is lifted from the contact 145 breaking the continuity circuit while exhaling drives the membrane 147 against the contacts 145 closing continuity of the circuit between the contact and between the lines 141 and 146 which briefly suspends the fragrance dispensing while on inhaling through the nose with dispensed fragrances directly into the nose with the inhaled air. The sensor can, however, be placed so that if one is breathing through the mouth only, the membrane 147 is moved such to stop dispensing.

Figure 12:
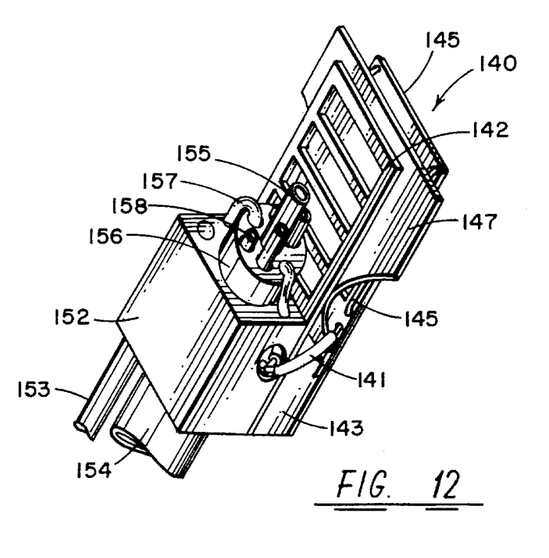
FIG. 12 is a perspective view of the breath sensor and fragrance dispenser.

In FIG. 12, an assembled dispenser end having the continuity breath sensor attached is illustrated. The continuity breath sensor 140 has the bottom plate 145 and the top plate 142 with the sensor membrane 147 mounted therebetween along with the contacts 145 attached thereto. The membrane 147 is attached to the spacer plate 143 while one of the conductors 141 is shown connected to the mounting block 152 having an extended rod 153 attached thereto which is used for attaching the assembly to a headset. The service tunnel 154 contains the fragrance laden capillary tubes and the gas lines back to the fragrance dispenser array along with the vacuum lines back to the vacuum valve and the sensor feedback signal wire from the sensor 140 back to the breath electronics. The vacuum line 155 extends just in front of the end 156 of the service bundle while the breath sensor feedback line 157 is shown feeding into the service bundle. A plurality of fragrance impermeable polyamide capillary tube ends 158 are positioned for dispensing the fragrances responsive to inhaling and exhaling through the nose against the sensor membrane 147 for the sensing of predetermined fragrances through each of the opening tubes 158.

Figure 13:
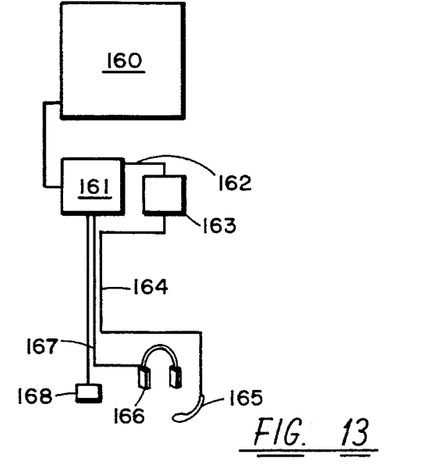
FIG. 13 is a schematic of a fragrance dispenser for a video game.
Figures 14, 15, 16:
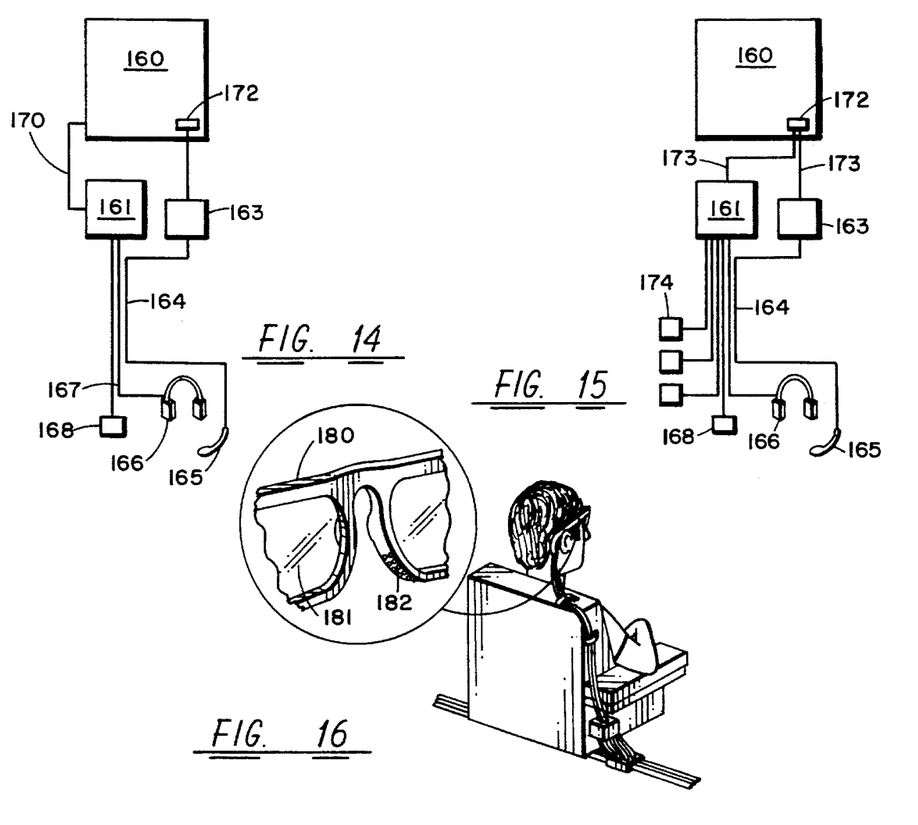
FIG. 14 is a schematic of a fragrance dispenser using on-screen optical cueing.
FIG. 15 is a schematic of a fragrance dispenser for use with broadcast TV.
FIG. 16 is a fragrance dispenser incorporated into 3-D glasses.

In FIGS. 13, 14 and 15, three separate schematics are illustrated for three different situations. In FIG. 13, a TV 160 for a video game system is connected to the video game system 161 which provides the cues to control the fragrance dispenser. The video game system 161 has a fragrance dispenser control line 162 connected to the fragrance dispenser electronics gas supply and manifold card 163 which direct gas through the individual gas lines 164 to the fragrance dispenser array 165. The headset 166 is connected by a conductor 167 to the video game system 161 and the handset 168 is connected to the game set 161 for operating the game. FIG. 14 uses an on-screen optical cueing and has the TV image controlled by the video game system 161 which has the fragrance dispenser cue signals sent through the conductor 170 to the TV monitor along with the game images. A series of blinking dots 171 appears on the corner of the TV screen and are picked up by the optical fiber array 172 and are fed to the fragrance dispenser electronics 163 which in turn are fed to the fragrance dispenser array 165. This system also has the headphones 166 connected through the conductor 167.

FIG. 15 has a closed circuit or commercial broadcast TV image on monitor 161, also having the blinking dots on the screen but which signals are fed through a pair of fiber optic cables 173 from fiber optic array 172. The fiber optic array 172 is fed to the fragrance dispenser electronics 163 to control the fragrance dispenser array 165. The blinking lights also have a feed to the limited interactive video game system 161 which has a plurality of feeds feeding a plurality of audio effects and animation units 174. A game controller 168 is also provided along with a pair of headphones 166.

Turning to FIG. 16, a modified pair of eyeglasses 180 are illustrated having a lens 181 which can, for instance, be 3-D glasses used for viewing a 3-D movie or image and has the passageway through the glasses with a plurality of openings 182 which are fragrance tube outlets which exhaust the fragrances directly at the wearer's nose openings. Each opening 182 can have a dispensing for one fragrance and replaces a dispenser arm extending in front of the user's nose.

It should be clear at this time that a precision fragrance dispenser has been provided in which fragrances can be delivered through a plurality of small capillary tubes to a person's nose which fragrances can be dispensed directly in front of the nose responsive to scenes being shown on a television monitor or in a movie or in connection with an electronic game. The fragrances are accurately dispensed adjacent the nose responsive to the user inhaling and exhaling through the nose and excess fragrances can be removed with a vacuum tube placed adjacent the nose or adjacent the fragrance dispensers. The accurate dispensing of a fragrance adjacent the nose reduces the amount of fragrance needed by others to produce the sensory effect on a person and, because of the small amount of fragrances produced and removed, the user is not inundated with fragrances as changes are made from one fragrance to another through different capillary tubes in accordance with the present invention. The dispensers advantageously produce the fragrance either adjacent the person's nose from fragrances stored or soaked into a fragrance supporting material which are then dispersed with a small amount of air or gas pressure applied therethrough for mixing the gas with the fragrance and dispersing the combination, or the fragrances can also be produced further away from the nose and dispersed in a similar manner without departing from the spirit and scope of the invention. Accordingly, the present invention should not be construed as limited to the forms shown which are to be considered illustrative rather than restrictive.

I claim:

1. A fragrance dispenser for use with synchronized visual images comprising:

a fragrance dispensing generator for generating a fragrance dispersing signal, said fragrance dispensing generator having a breath sensor for sensing a person's breath;

a plurality of fragrance dispensers coupled to said fragrance dispenser generator and each having a fragrance release portion positioned adjacent a person's nose for dispensing a fragrance adjacent the nose responsive to a fragrance dispensing signal from said fragrance dispensing generator;

a source of pressurized gas connected to each fragrance dispenser; and a gas pressure control mechanism connected between said source of pressurized gas and each of said plurality of fragrance dispensers for controlling the dispersion of a plurality of different fragrances responsive to said fragrance dispensing generator, whereby a fragrance is dispensed adjacent a person's nose.

2. A fragrance dispenser for use with synchronized visual images in accordance with claim 1 in which said breath sensor includes a flexible thin flat surface having a conductive surface thereon and having a pair of spaced contacts on one side of said thin flat surface.

3. A fragrance dispenser for use with synchronized visual images in accordance with claim 2 in which said breath sensor has a plate located on either side of said flexible thin flat surface, each plate having a plurality of openings therethrough.

4. A fragrance dispenser for use with synchronized visual images in accordance with claim 1 in which each said fragrance dispenser includes a housing having an absorbent material therein for supporting a fragrance absorbed therein.

5. A fragrance dispenser for use with synchronized visual images in accordance with claim 4 in which said fragrance dispenser housing has a membrane covering one end thereof and said membrane having at least one opening therethrough to allow the egress of a fragrance.

6. A fragrance dispenser for use with synchronized visual images in accordance with claim 5 in which said fragrance dispenser housing has a flexible membrane having a plurality of openings therethrough.

7. A fragrance dispenser for use with synchronized visual images in accordance with claim 6 in which said fragrance dispenser flexible membrane has a slot opening therein which is opened to the egress of a fragrance when said flexible membrane is expanded responsive to gas pressure from said source of pressurized gas.

8. A fragrance dispenser for use with synchronized visual images in accordance with claim 6 in which said flexible membrane has a plurality of slot openings forming a symmetrical pattern therearound.

9. A fragrance dispenser for use with synchronized visual images in accordance with claim 4 in which said absorbent material is an open cell polymer.

10. A fragrance dispenser for use with synchronized visual images in accordance with claim 4 including a vacuum source connected to a vacuum line connected to said fragrance dispensers for removing dispensed fragrances.

11. A fragrance dispenser for use with synchronized visual images in accordance with claim 1 including a pair of eyeglass frames have a plurality of passageways therethrough opening adjacent a person's nose for dispersion of fragrance therethrough.

12. A fragrance dispenser for use with synchronized visual images in accordance with claim 4 in which said fragrance dispenser housing has a second flexible membrane covering the other end thereof and said second membrane having at least one opening therethrough to allow the ingress of a gas into said housing.

13. A fragrance dispenser for use with synchronized visual images in accordance with claim 1 in which said fragrance dispenser is attached to a head set and is supported in front of a person's nose.

14. A fragrance dispenser for use with synchronized visual images in accordance with claim 2 including a frame having said breath sensor and each said fragrance dispenser outlet attached thereto and positioned in front of a person's nose.

15. A fragrance dispenser for use with synchronized visual images in accordance with claim 1 in which said source of pressurized gas includes an air compressor for compressing air.

16. A fragrance dispenser for use with synchronized visual images comprising:

a plurality of fragrance dispensers positioned adjacent a person's nose for dispensing a fragrance adjacent the person's nose, each fragrance dispenser having a housing having a absorbent material therein having a fragrance absorbed therein and said housing having an opening therefrom opened upon said housing being pressurized above a predetermined pressure; and a source of pressurized gas connected to each fragrance dispenser housing for applying a gas under pressure into each said fragrance housing for selectively pressurizing a housing to disperse a fragrance from said housing opening for producing a fragrance upon the application of a gas under pressure into a selected housing; whereby a fragrance may be dispensed adjacent a person's nose responsive to the application of a gas under pressure into said fragrance dispenser housing.

17. A fragrance dispenser for use with synchronized visual images in accordance with claim 16 in which said source of pressurized gas is a manually squeezed member.

18. A fragrance dispenser for use with synchronized visual images in accordance with claim 16 in which said source of pressurized gas is a compressed gas container.

19. A fragrance dispenser for use with synchronized visual images in accordance with claim 16 in which said source of pressurized gas is an air compressor.

20. A fragrance dispenser for use with synchronized visual images in accordance with claim 16 in which each said fragrance dispenser housing opening is a capillary tube.

* * * * *